United States Patent
Kuo

(10) Patent No.: US 7,052,148 B2
(45) Date of Patent: May 30, 2006

(54) DOOR MIRROR OF AUTOMOBILE

(75) Inventor: Feng-Mei Kuo, Yungkang (TW)

(73) Assignee: Aloha Auto Industry Co., Yungkang (TW)

( * ) Notice: Subject to any disclaimer, the term of this patent is extended or adjusted under 35 U.S.C. 154(b) by 0 days.

(21) Appl. No.: 10/959,271

(22) Filed: Oct. 6, 2004

(65) Prior Publication Data
US 2005/0134984 A1 Jun. 23, 2005

(30) Foreign Application Priority Data
Dec. 22, 2003 (TW) .............................. 92222602 U

(51) Int. Cl.
G02B 5/08 (2006.01)
G02B 7/18 (2006.01)

(52) U.S. Cl. ...................................... 359/841; 359/872

(58) Field of Classification Search ................ 359/879, 359/841, 875, 872

See application file for complete search history.

(56) References Cited

U.S. PATENT DOCUMENTS

| 4,606,619 | A | * | 8/1986 | Yamana | 248/549 |
| 4,789,232 | A | * | 12/1988 | Urbanek | 248/549 |
| 5,841,594 | A | * | 11/1998 | Rothe | 359/841 |
| 6,322,221 | B1 | * | 11/2001 | van de Loo | 359/841 |
| 6,371,620 | B1 | * | 4/2002 | Lang et al. | 359/872 |

FOREIGN PATENT DOCUMENTS

JP 359120540 A * 7/1984

* cited by examiner

Primary Examiner—Mark A. Robinson
Assistant Examiner—Scott Stephens
(74) Attorney, Agent, or Firm—Alan D. Kamrath; Nikolai & Mersereau, P.A.

(57) ABSTRACT

Provided is a door mirror of automobile. The mirror comprises a frame fitted with a piece of glass, a bracket mounted on a body of the automobile and shaped to matingly couple to the frame, and a gear mechanism disposed in the connecting portions of both the frame and the bracket. A clockwise or counterclockwise turning of the frame about a pivot of the gear mechanism causes meshed gearwheels of the gear mechanism to rotate the same, thereby adjusting an angle of the frame about the bracket in a smooth, precise way.

2 Claims, 4 Drawing Sheets

DOOR MIRROR OF AUTOMOBILE

FIELD OF THE INVENTION

The present invention relates to door mirrors of automobiles and more particularly to an improved door mirror of an automobile.

BACKGROUND OF THE INVENTION

A variety of door mirrors of an automobile have been available. However, none of them are interchangeable as far as the present inventor is aware. Moreover, many types of door mirror are relatively complex in constructions, costly to manufacture, trouble-prone, and unreliable in use. Thus, the need for improvement still exists.

SUMMARY OF THE INVENTION

It is an object of the present invention to provide a door mirror mounted on an automobile, comprising a frame fitted with a piece of glass and comprising upper and lower first attachment members extended toward a body of the automobile, either first attachment member including a recess in its bottom or top, a circular cavity on the recess, and a vertical hole through the cavity to be in communication with the top and the bottom; two resilient members each disposed in a shoulder of the hole; a bracket mounted on the body of the automobile and comprising upper and lower second attachment members being shaped to matingly couple to the lower and upper first attachment members respectively wherein the upper second attachment member comprises a top circular cavity and the lower second attachment member comprises a bottom circular cavity; two pairs of gearwheels wherein each gearwheel comprises a central aperture and an annular toothed section formed on one surface around the aperture, the upper first and second attachment members one gearwheel of one pair is disposed in the cavity of the upper first attachment member with its toothed section being flush with the recess of the upper first attachment member, the other gearwheel of one pair is rested upon the top circular cavity of the upper second attachment member with its toothed section being flush with a top of the upper second attachment member, one gearwheel of the other pair is disposed in the cavity of the lower first attachment member with its toothed section being flush with the recess of the lower first attachment member, the other gearwheel of the other pair is rested upon the bottom circular cavity of the lower second attachment member with its toothed section being flush with a bottom of the lower second attachment member such that each pair of gearwheels are meshed together, and the aperture of each gearwheel in the circular cavity of either second attachment member has internal threads; and two screws each having an outer threaded section at its end portion, the threaded section being adapted to secure to the threads of the aperture when the screw is driven through the resilient member, the hole, and the aperture of one gearwheel of one pair into the aperture of the other gearwheel of one pair, wherein a clockwise or counterclockwise turning of the frame about the screws causes the gearwheels disposed in the first attachment members to rotate clockwise or counterclockwise relative to the gearwheels in the second attachment members.

The above and other objects, features and advantages of the present invention will become apparent from the following detailed description taken with the accompanying drawings.

DETAILED DESCRIPTION OF THE PREFERRED EMBODIMENTS

Figure 1:
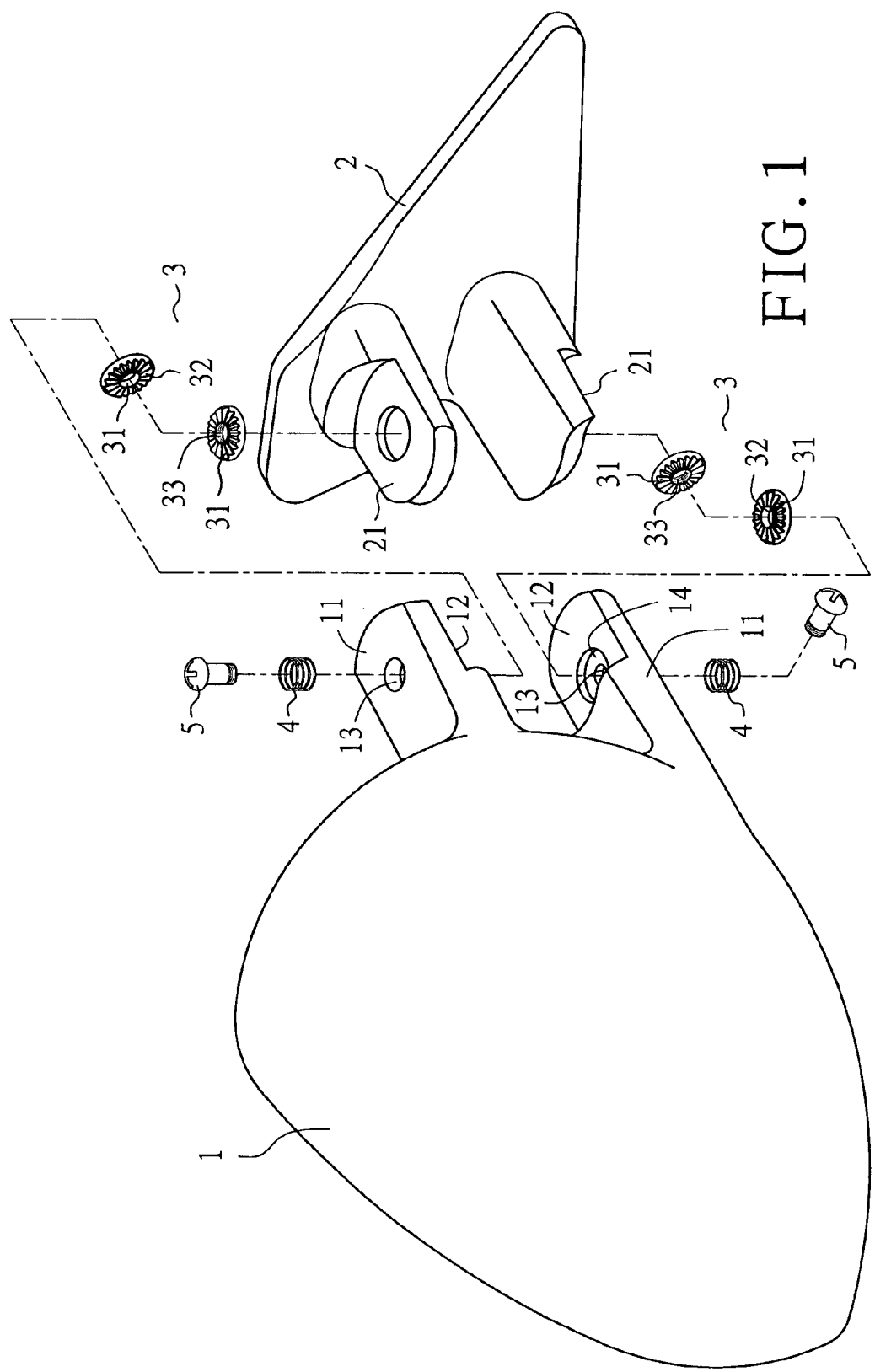
FIG. 1 is an exploded view of a preferred embodiment of door mirror of automobile according to the invention.
Figure 2:
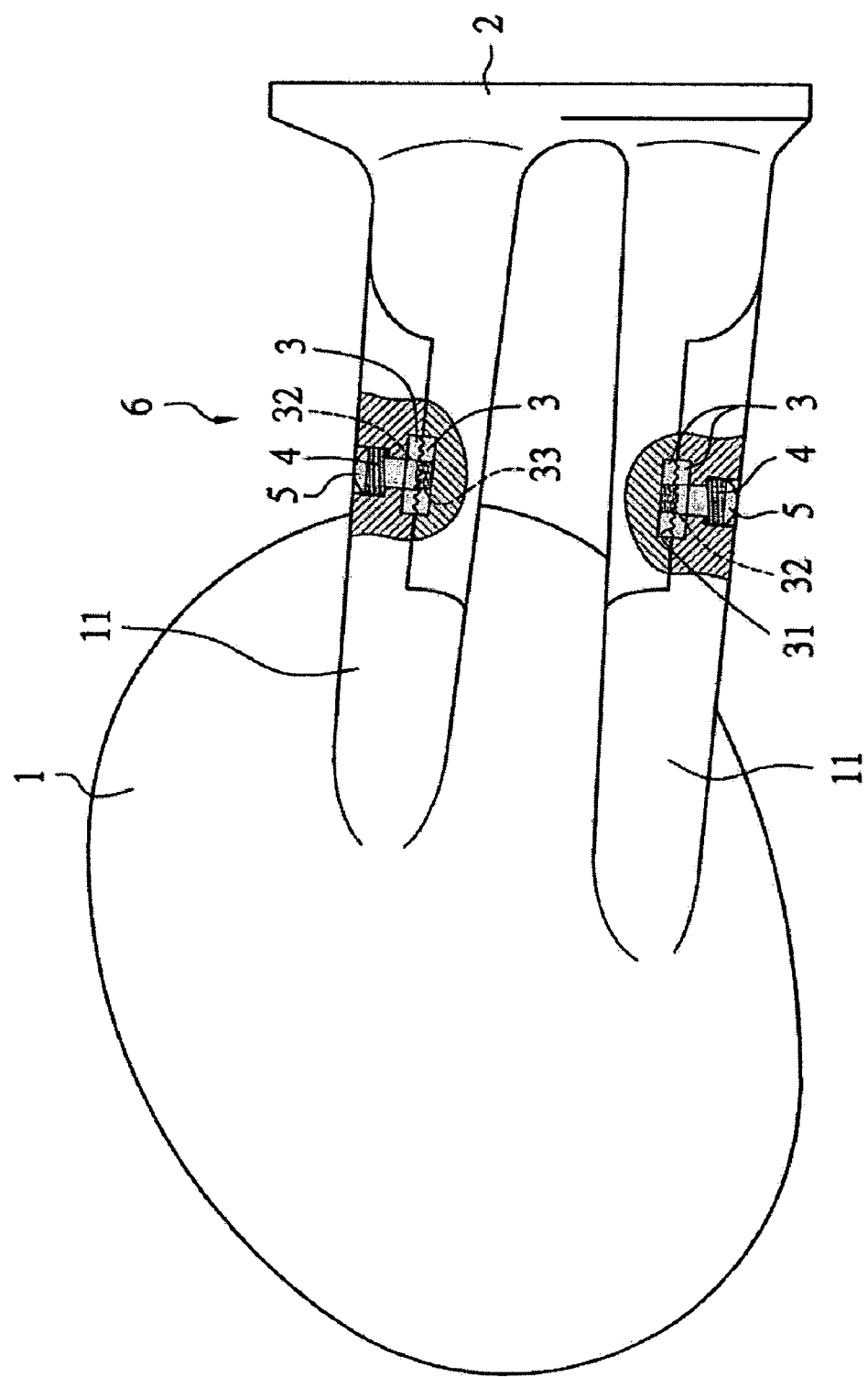
FIG. 2 is a front plan view in part section of the assembled door mirror.
Figure 3:
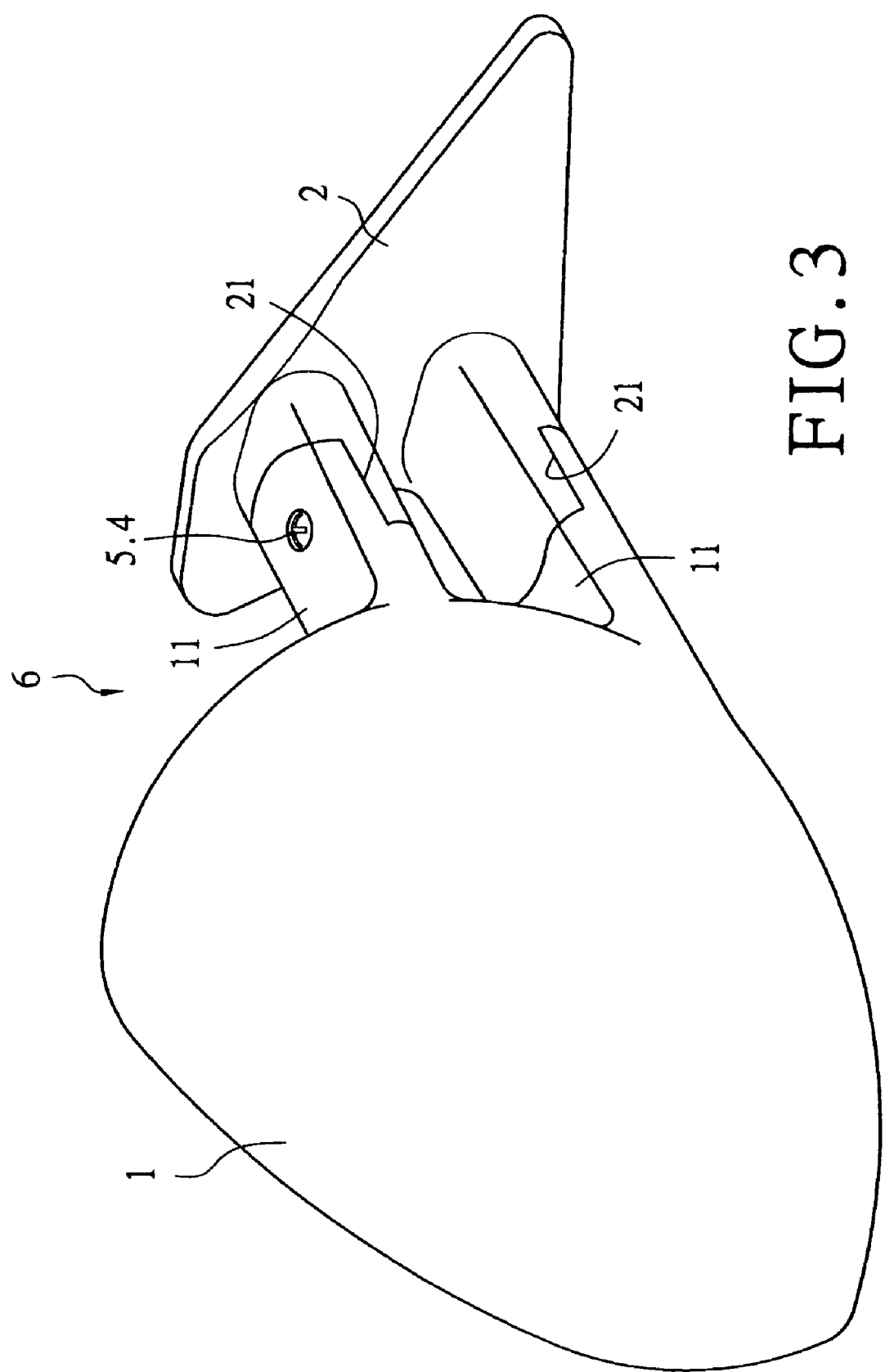
FIG. 3 is a perspective view of the door mirror.

Referring to FIGS. 1 to 4, there is shown a door mirror mountable in an automobile in accordance with a preferred embodiment of the invention. The door mirror comprises a frame 1 and a bracket 2. Each component will be described in detailed below.

The frame 1 is fitted with a piece of glass and comprises upper and lower first attachment members 11 extended toward the body of an automobile. Each first attachment member 11 is a flat member and comprises a recess 12 in its bottom or top, a circular cavity 14 on the recess 12, and a vertical hole 13 through the cavity 14 to be in communication with the top and the bottom. Two compression springs 4 each is rested upon a shoulder in the hole 13. A gear assembly is provided and comprises a pair of gearwheels 3. The gearwheel 3 comprises a central aperture 32 and an annular, toothed section 31 formed on one surface around the aperture 32.

The bracket 2 is mounted on the body of the automobile and comprises upper and lower second attachment members 21 being shaped to matingly couple to the lower and upper first attachment members 11 respectively.

For the upper first and second attachment members 11 and 21, one gearwheel 3 is disposed in the cavity 14 with its toothed section 31 being flush with the recess 12, and the other gearwheel 3 is rested upon a top circular cavity 22 of the second attachment member 21 with its toothed section 31 being flush with the top of the second attachment member 21.

For the lower first and second attachment members 11 and 21, one gearwheel 3 is disposed in the cavity 14 with its toothed section 31 being flush with the recess 12, and the other gearwheel 3 is rested upon a bottom circular cavity 22 of the second attachment member 21 with its toothed section 31 being flush with the bottom of the second attachment member 21.

Also, the central aperture 32 of the other gearwheel 3 in the circular cavity 22 of the second attachment member 21 is formed as a threaded one so as to threadedly secure to an end portion of the shank of either screw 5 driven through the spring 4, the hole 13, and the central aperture 32 of one gearwheel 3 into the central aperture 32 of the other gearwheel 3. In this position (see FIG. 3), each pair of gearwheels 3 are meshed together.

Figure 4:
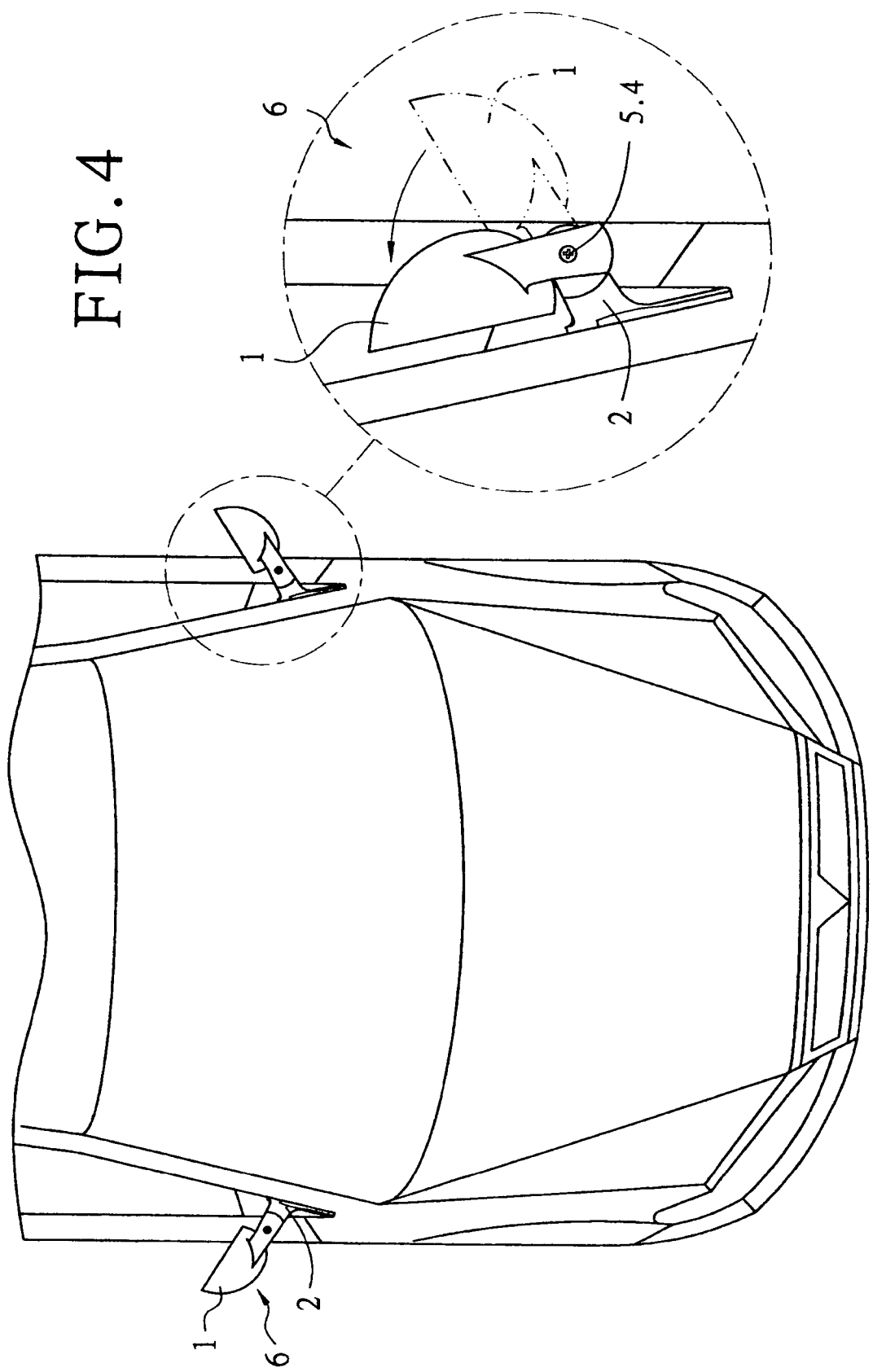
FIG. 4 is a top plan view of two door mirrors mounted on an automobile with one of them being shown in detail for illustrating a pivoting of the door mirror.

As shown in FIG. 4, for retracting the door mirror toward the body of the automobile, a driver may counterclockwise turn the frame 1 about a pivot (i.e., the screws 5) with the gearwheels 3 disposed in the first attachment members 11 of the frame 1 being smoothly rotated relative to the gearwheels 3 disposed in the second attachment members 21 of the bracket 2. The extending of the door mirror relative to the body of the automobile is a simple reverse operation of the above. Thus, it will not be described in detail. In view of the above, it is seen that an angle of the frame 1 about the bracket 2 can be adjusted smoothly and precisely.

While the invention herein disclosed has been described by means of specific embodiments, numerous modifications and variations could be made thereto by those skilled in the art without departing from the scope and spirit of the invention set forth in the claims.

What is claimed is:

1. A door mirror mounted on an automobile, comprising:
   a frame fitted with a piece of glass and comprising upper and lower first attachment members extended toward a body of the automobile, either first attachment member including a recess in its bottom or top, a circular cavity on the recess, and a vertical hole through the cavity to be in communication with the top and the bottom;
   two resilient members each disposed in a shoulder of a hole;
   a bracket mounted on the body of the automobile and comprising upper and lower second attachment members being shaped to matingly couple to the lower and upper first attachment members respectively wherein the upper second attachment member comprises a top circular cavity and the lower second attachment member comprises a bottom circular cavity;
   two pairs of gearwheels wherein each gearwheel comprises a central aperture and an annular toothed section formed on one surface around the aperture, one gearwheel of one pair is disposed in the cavity of the upper first attachment member with its toothed section being flush with the recess of the upper first attachment member, the other gearwheel of the one pair is rested upon the top circular cavity of the upper second attachment member with its toothed section being flush with a top of the upper second attachment member, one gearwheel of the other pair is disposed in the cavity of the lower first attachment member with its toothed section being flush with the recess of the lower first attachment member, the other gearwheel of the other pair is rested upon the bottom circular cavity of the lower second attachment member with its toothed section being flush with a bottom of the lower second attachment member such that each pair of gearwheels are meshed together, and the aperture of each gearwheel in the circular cavity of either second attachment member has internal threads; and
   two screws each having an outer threaded section at its end portion, the threaded section being adapted to secure to the threads of the aperture when the screw is driven through the resilient member, the hole, and the aperture of one gearwheel of one pair into the aperture of the other gearwheel of one pair,
   wherein a clockwise or counterclockwise turning of the frame about the screws causes the gearwheels disposed in the first attachment members to rotate clockwise or counterclockwise relative to the gearwheels in the second attachment members.

2. The door mirror of claim 1, wherein the resilient member is a compression spring.

* * * * *